(12) United States Patent
Oikawa

(10) Patent No.: US 8,989,074 B2
(45) Date of Patent: Mar. 24, 2015

(54) COMMUNICATION APPARATUS, COMMUNICATION METHOD, AND COMMUNICATION SYSTEM

(75) Inventor: Tomoya Oikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 290 days.

(21) Appl. No.: 13/476,507

(22) Filed: May 21, 2012

(65) Prior Publication Data

US 2012/0314596 A1    Dec. 13, 2012

(30) Foreign Application Priority Data

Jun. 10, 2011    (JP) ................................. 2011-130654

(51) Int. Cl.
| | |
|---|---|
| H04L 12/28 | (2006.01) |
| H04H 20/71 | (2008.01) |
| H04W 4/00 | (2009.01) |
| H04W 28/22 | (2009.01) |
| H04L 12/18 | (2006.01) |
| H04W 4/06 | (2009.01) |
| H04W 24/10 | (2009.01) |
| H04W 76/00 | (2009.01) |
| H04W 72/00 | (2009.01) |

(52) U.S. Cl.
CPC ........... *H04W 28/22* (2013.01); *H04L 12/1863* (2013.01); *H04W 4/06* (2013.01); *H04W 24/10* (2013.01); *H04W 76/002* (2013.01); *H04W 72/005* (2013.01)

USPC ............................ 370/312; 370/252; 370/332

(58) Field of Classification Search
None
See application file for complete search history.

(56) References Cited

U.S. PATENT DOCUMENTS

| | | | | |
|---|---|---|---|---|
| 2006/0218264 | A1* | 9/2006 | Ogawa et al. ................. | 709/223 |
| 2009/0147734 | A1* | 6/2009 | Naka et al. .................... | 370/329 |
| 2009/0196237 | A1* | 8/2009 | Jonsson ........................ | 370/329 |
| 2011/0122804 | A1* | 5/2011 | Iyer et al. ...................... | 370/311 |
| 2011/0194650 | A1* | 8/2011 | Lee et al. ...................... | 375/316 |
| 2011/0211517 | A1* | 9/2011 | Moscibroda et al. ......... | 370/312 |
| 2011/0305161 | A1* | 12/2011 | Ekpenyong et al. .......... | 370/252 |
| 2012/0314595 | A1* | 12/2012 | Oikawa ......................... | 370/252 |

FOREIGN PATENT DOCUMENTS

JP    2010-161554    7/2010

OTHER PUBLICATIONS

U.S. Appl. No. 13/473,157, filed May 16, 2012, Oikawa.

* cited by examiner

*Primary Examiner* — Jutai Kao
(74) *Attorney, Agent, or Firm* — Oblon, McClelland, Maier & Neustadt, L.L.P.

(57) ABSTRACT

A communication apparatus that receives, from a plurality of other communication apparatuses, information indicating communication quality of a multicast transmission transmitted from the communication apparatus to each of the plurality of other communication apparatuses, and controls a multicast transmission rate based on the information received from the plurality of other communication apparatuses.

18 Claims, 5 Drawing Sheets

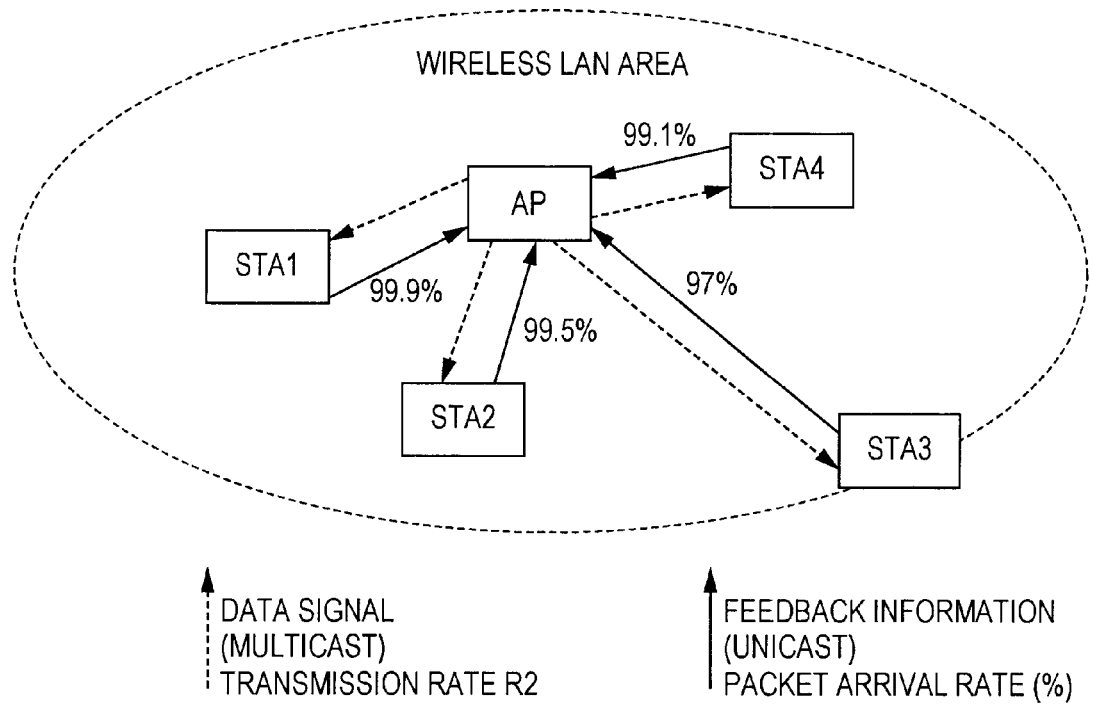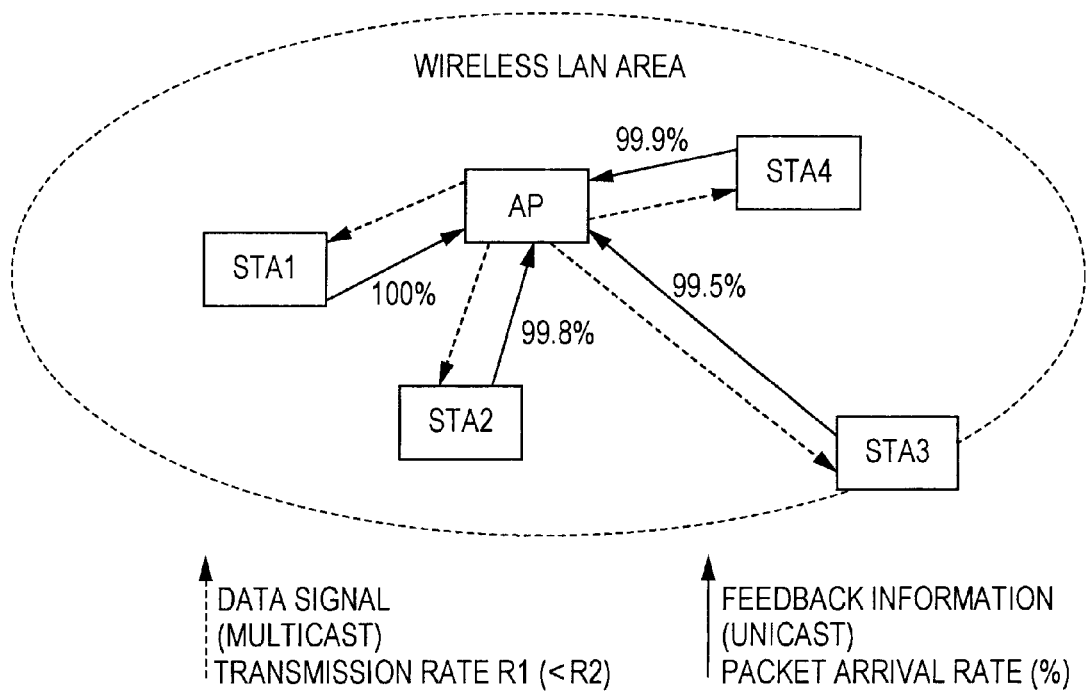

COMMUNICATION APPARATUS, COMMUNICATION METHOD, AND COMMUNICATION SYSTEM

CROSS REFERENCE TO RELATED APPLICATIONS

This application claims the benefit of priority under 35 U.S.C. §119 to Japanese Priority Patent Application JP 2011-130654 filed in the Japan Patent Office on Jun. 10, 2011, the entire contents of which is hereby incorporated by reference.

BACKGROUND

The present disclosure relates to a communication apparatus, a communication method and a communication system performing multicast transmission of the same data with respect to a plurality of receiving terminals, and in particular, to a communication apparatus and a communication method dynamically optimizing the multicast transmission rate, as well as a communication system.

As typical wireless LAN (Local Area Network) methods of communication, unicast communication transmitting data to a single terminal and multicast communication transmitting the same data to a plurality of terminals may be exemplified.

In multicast communication, the same data may be transmitted at one time to a plurality of receiving terminals, whereby it is possible to reduce the use of transmission bandwidth. For example, in a case where a large amount of data such as a video is transmitted wirelessly, multicast communication is considered to be effective when the wireless communication transmission capacity is increased.

In wireless communication, typically, when the distance between transmission and reception is short (good communication quality), communication is performed at a high speed transmission rate, and when the distance between transmission and reception is long (poor communication quality), communication is performed after switching to a low speed transmission rate. For example, in a wireless LAN system including an access point (AP) and a client station (STA), a plurality of transmission rates are prescribed in order to communicate efficiently with a wide service area.

However, when performing multicast transmission of multicast data from the access point AP to a plurality of client stations configuring a multicast group, the slowest transmission rate is often selected. This is because multicast communication is different from unicast communication and there is no retransmission mechanism. Without information on whether a packet is transmitted correctly being returned from each client station, even if a packet from the access point AP is not transmitted correctly, it is difficult to perform retransmission.

FIG. 6 shows a situation of performing multicast transmission from one multicast transmission station (hereinafter, simply referred to as "transmission station") to a plurality (four in the illustrated example) of multicast reception stations (simply referred to as "reception station") 1 to 4.

For example, in wireless LAN systems in infrastructure mode, the access point AP becomes a multicast transmission station and each client station STA accommodated in a service area may become a multicast reception station. However, in a wireless system in which there is no control station such as an access point AP in ad-hoc mode or the like, arbitrary communication stations may become multicast transmission stations and multicast reception stations.

In the example shown in FIG. 6, the transmission station selects the lowest transmission rate R1 and the data signal (multicast data) is transmitted. Thus, the multicast data is delivered even at a reception station 3 for which the reception level is low at the end of the service area of the transmission station and for which the communication quality is poor. However, when multicast data of a large data size is generated at the transmission station, since the multicast data is buffered and the transmission rate is low, the time during which the wireless bandwidth is occupied becomes long. At this time, in a case where unicast communication such as of sound or images is performed between the transmission station and the other reception stations 1, 2, and 4 where the transmission quality is good, unicast data loss occurs, and a situation in which transmission efficiency is significantly reduced may occur.

On the other hand, when the multicast transmission rate is increased, since the time during which multicast transmission occupies the wireless bandwidth does not become long, the opportunity to transmit unicast data such as of sound or images is increased and loss is eliminated. FIG. 7 shows a situation of performing multicast transmission from one transmission station to a plurality of reception stations 1 to 4 at a transmission rate R2 (R2>R1) higher than a lowest transmission rate R1. In this case, the reception station 4 for which the reception level is low at the end of the service area of the transmission station and the communication quality is poor may not receive the multicast data at the transmission rate R2. In addition, since the reception station 4 does not return a reception acknowledgment ACK corresponding to the multicast data, the transmission station may not detect non-delivery of the multicast data due to the degradation of the communication quality.

In short, when the multicast transmission rate is fixed at the slower rate side, the time during which the wireless bandwidth is occupied becomes long, whereby there is a problem in that the overall transmission efficiency of the system is deteriorated. Conversely, when the multicast transmission rate is fixed at the higher rate side, there are problems in that the communication quality is degraded and the non-delivery of the multicast data at the reception station may not be detected.

Incidentally, a transmission station apparatus which dynamically sets the multicast transmission rate and a wireless communication system have been proposed. The transmission station apparatus periodically transmits a pseudo training signal at a predetermined multicast transmission rate using unicast or multicast to each of a plurality of transmission station apparatuses and receives ACK responses from the plurality of transmission station apparatuses with respect to the pseudo training signal. Then, the transmission station apparatus varies the multicast transmission rate according to the presence or absence of the ACK responses from the plurality of reception station apparatuses and repeats the unicast transmission of the pseudo training signal. When there are ACK responses from all of the plurality of reception station apparatuses, the multicast transmission rate is selected as a predetermined multicast transmission rate (for example, refer to Japanese Unexamined Patent Application Publication No. 2010-161554).

In the above wireless communication system, when a pseudo-training signal is transmitted by unicast transmission, even in a state where the communication quality is degraded, there are times when data is delivered to the reception station apparatus by the retransmission control function. As a result, it is determined that the communication quality is better than it actually is, whereby there is a tendency to select a high multicast transmission rate. Meanwhile, the retransmission control in the multicast transmission typically does not function. Since the pseudo training signal is delivered to the reception station apparatus according to this difference, the unicast transmission rate at that time is selected as a predetermined multicast transmission rate. In such a case, even when transmission is performed using multicast, a situation in which the multicast data is not delivered may occur.

On the other hand, in a case where the pseudo training signal is transmitted by multicast transmission, the transmission is only performed periodically at a predetermined cycle. Therefore, in a wireless transmission path in which link loss is generated at a certain frequency, a situation may occur in which a pseudo training signal may not be received due to the momentarily poor communication quality. As a result, even though the bandwidth is sufficient, a low multicast transmission rate may be set, and there is a problem in that the overall transmission efficiency of the system is deteriorated.

In addition, in the above wireless communication system, the channel quality is estimated using the pseudo-training signal. For this reason, only at the periodic training moment, the transmission station apparatus may not dynamically optimize the multicast transmission rate in relation to changes of communication quality or the like caused by ongoing variations of the transmission environment on the reception station apparatus side. In other words, even if there are variations in the communication environment during multicast transmission at each reception station configuring the multicast group, the transmission station apparatus may not correspond thereto.

SUMMARY

It is desirable to provide a superior communication apparatus, communication method, and communication system, which are capable of setting an appropriate transmission rate and performing multicast transmission.

It is desirable to provide a superior communication apparatus, communication method, and communication system, which are capable of dynamically optimizing the multicast transmission rate in response to changes of communication quality or the like caused by ongoing variations of the transmission environment.

The present disclosure was made by taking the above problems into consideration.

According to a first embodiment, the disclosure is directed to a communication apparatus that receives, from a plurality of other communication apparatuses, information indicating communication quality of a multicast transmission transmitted from the communication apparatus to each of the plurality of other communication apparatuses, and controls a multicast transmission rate based on the information received from the plurality of other communication apparatuses.

According to another embodiment, the disclosure is directed to a communication apparatus that receives a multicast transmission from another communication apparatus, determines information indicating communication quality of the multicast transmission received from the another communication apparatus, and transmits the information to the another communication apparatus that controls a multicast transmission rate based on the information.

According to another exemplary embodiment, the disclosure is directed to a communication system that includes a plurality of first communication apparatuses that each receive a multicast transmission from a second communication apparatus, determine information indicating communication quality of the multicast transmission received from the another communication apparatus, and transmit the information to the second communication apparatus. The second communication apparatus receives the information from the plurality of first communication apparatuses, and controls a multicast transmission rate based on the information received from the plurality of first communication apparatuses.

However, the term "system" used here refers to something in which a plurality of apparatuses (or modules implementing a specific function) is logically assembled and it does not particularly matter if each apparatus or function module is within a single housing or not.

According to the technique described in the present disclosure, there is provided a superior communication apparatus, communication method, and communication system, which are capable of dynamically optimizing the multicast transmission rate in response to changes of communication quality or the like caused by ongoing variations of the transmission environment.

According to the technique disclosed in the present disclosure, feedback information of communication quality with respect to multicast transmission between the transmission station transmitting data by multicast and a plurality of reception stations configuring a multicast group is transmitted and received and the transmission station may dynamically optimize and set the multicast transmission rate with respect to the communication quality in each reception station according to the communication environment. In this manner, even if there are variations in the communication environment during multicast transmission at each reception station configuring the multicast group, it is possible to reliably transmit multicast data to each reception station from the transmission station.

In addition, according to the techniques disclosed in the present disclosure, even if there are ongoing variations in the transmission environment while multicast transmission is performed, since a multicast transmission rate satisfying a predetermined communication quality is set in all of the plurality of reception stations configuring the multicast group, it is possible to reliably perform multicast transmission with respect to all the client stations in the multicast group.

Other objects, features and advantages of the techniques described in the present disclosure will become apparent from the more detailed description based on the embodiments and accompanying drawings described below.

BRIEF DESCRIPTION OF THE DRAWINGS

FIG. 4 is a view showing a situation where a client station moves to an end portion of the service area of the access point AP and packet loss is greatly generated when data is transmitted by multicast from the access point to each client stations in the multicast group.

FIG. 5 is a view showing a situation in which the communication quality of the client station is improved by the access point AP setting the multicast transmission rate to R1 which is one stage lower than R2 in the situation shown in FIG. 4.

DETAILED DESCRIPTION OF EMBODIMENTS

Below, embodiments of the technique described in the present disclosure are explained in detail with reference to the drawings.

As an embodiment of the wireless communication system performing multicast transmission relating to the technique described in the present disclosure, a wireless LAN system may be exemplified. That is, in a wireless LAN system in infrastructure mode, an access point AP becomes a multicast transmission station and each client station STA accommodated in a service area may become a multicast reception station. Here, each client station configuring the multicast group receives multicast data and also returns feedback information relating to the communication quality of the multicast data respectively received at a predetermined cycle. Below, description is given of a case where a multicast transmission rate is dynamically set in a period when multicast transmission of multicast data is performed from an access point AP to a plurality of client stations configuring a multicast group.

Figure 1:
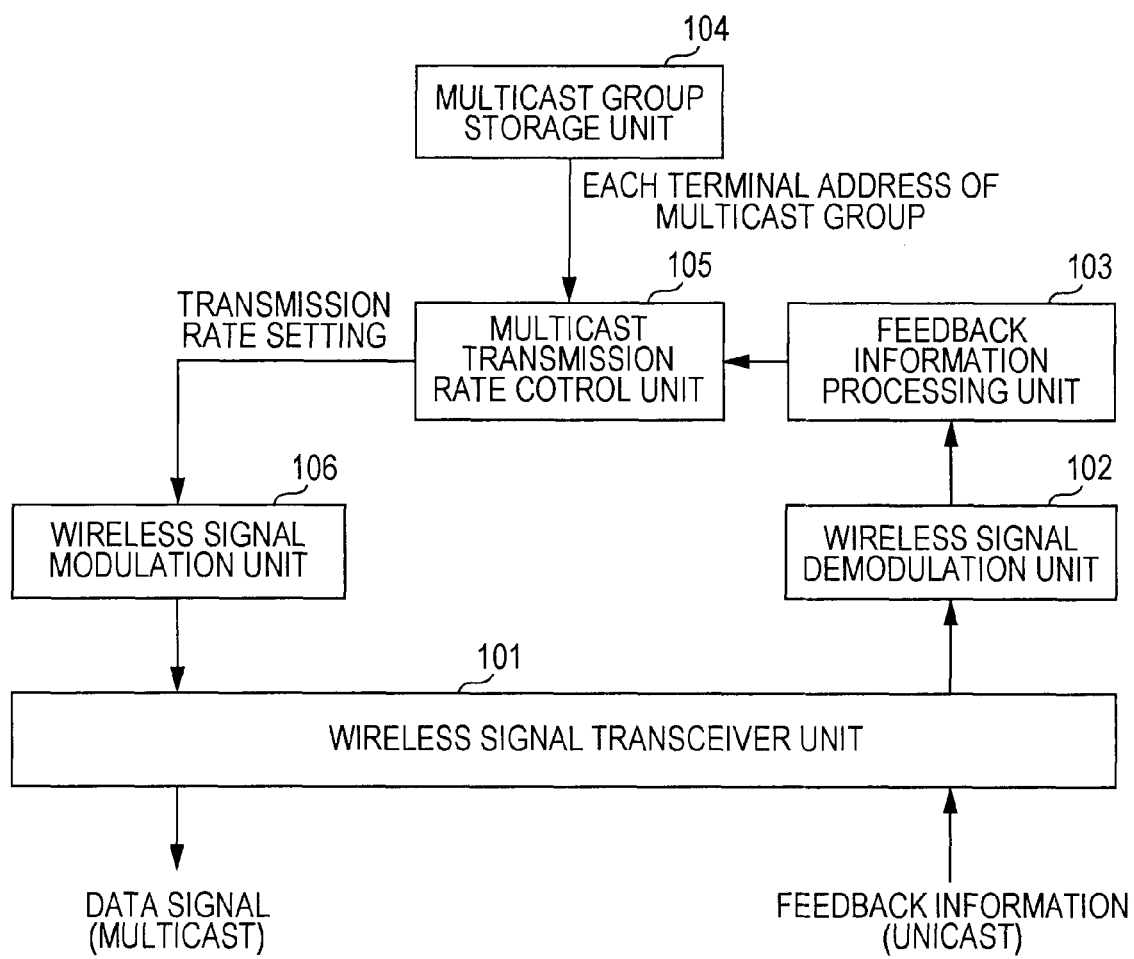
FIG. 1 is a diagram schematically showing a functional configuration for an access point AP in a wireless LAN system to determine the optimum value of a multicast transmission rate according to the communication quality of each wireless reception station.

FIG. 1 schematically shows a functional configuration for an access point AP in a wireless LAN system to determine the optimum value of a multicast transmission rate according to the communication quality of each wireless reception station. The shown access point AP is provided with a wireless signal transceiver unit 101, a wireless signal demodulation unit 102, a feedback information processing unit 103, a multicast group storage unit 104, a multicast transmission rate control unit 105, and a wireless signal modulation unit 106.

The wireless signal transceiver unit 101 sequentially receives feedback information on the multicast transmission transmitted periodically from each of the client stations that configure the multicast group and sends the feedback information to the wireless signal demodulation unit 102.

The wireless signal demodulation unit 102 extracts the data from the wireless signal and sends the data to the feedback information processing section 103.

The feedback information processing section 103 extracts the feedback information relating to the communication quality from the respectively received data of the plurality of wireless reception stations and provides notification of the values to the multicast transmission rate control unit 105.

In the wireless LAN system, the kind of information used as feedback information relating to communication quality is arbitrary. As one index indicating the deterioration of the quality of the propagation channel, packet loss rate (PLR) is widely known. Below, description is given with the arrival rate of packets (=1-PLR) transmitted using multicast set as feedback information so that a higher value indicates a more favorable communication quality.

The multicast transmission rate control unit 105 determines whether all of the wireless reception stations satisfy a predetermined communication quality from each terminal address of the multicast group from the multicast group storage unit 104 and the feedback information acquired from each of the plurality of wireless reception stations. Then, the multicast transmission rate control unit 105 determines the optimal value of the multicast transmission rate according to the determination result and sets the value for the wireless signal modulation unit 106. The details of the processing procedure for determining the optimal value of the multicast transmission rate in the multicast transmission rate control unit 105 are described below.

The wireless signal modulation unit 106 sets the multicast transmission rate for which notification is provided from the multicast transmission rate control unit 105 for the wireless signal transceiver unit 101. In this manner, multicast transmission from the wireless signal transceiver unit 101 to each client station is performed using the set multicast transmission rate.

Figure 2:
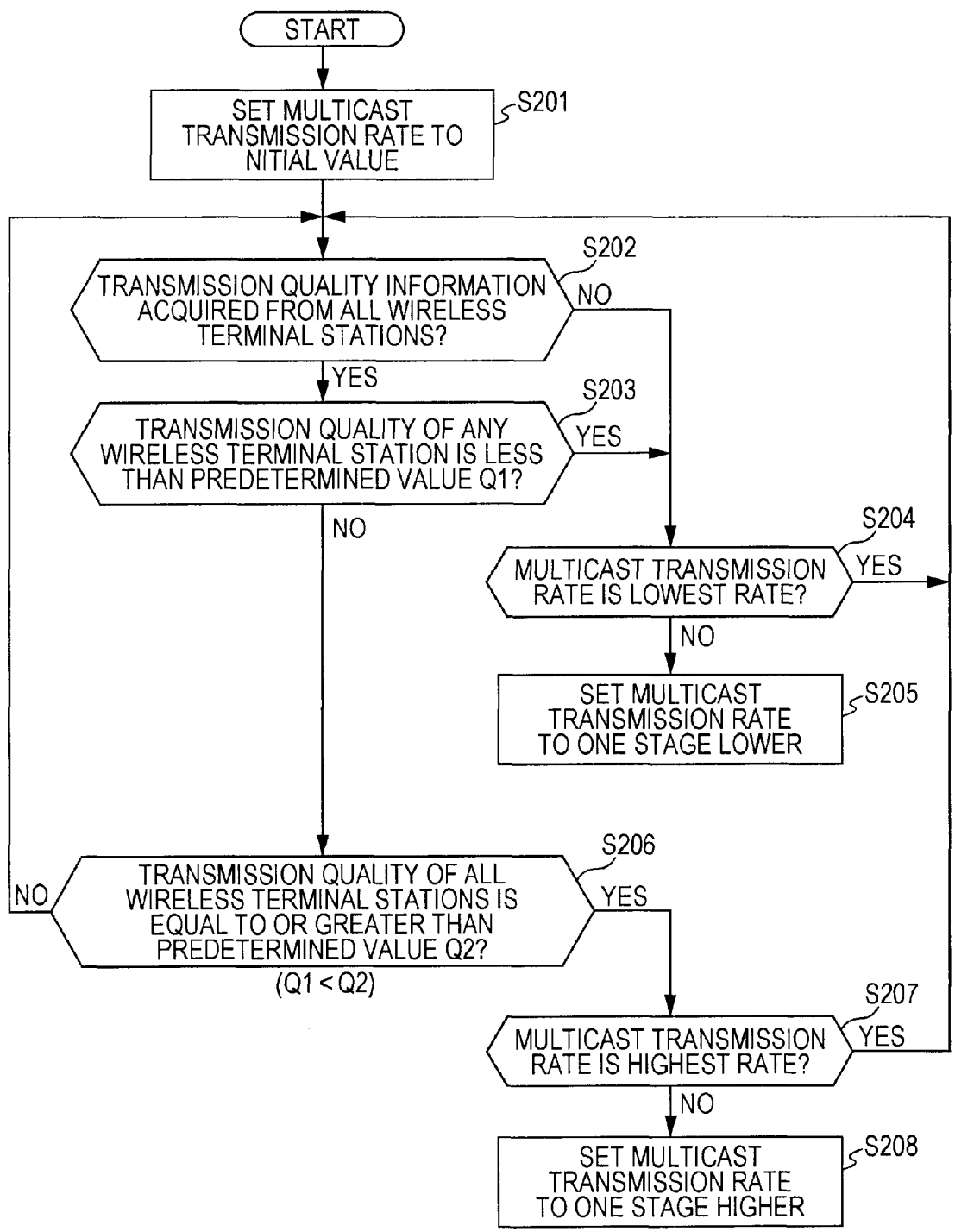
FIG. 2 is a flowchart showing a processing procedure performed in the multicast transmission rate control unit for determining the optimum value of the multicast transmission rate according to the communication quality of each wireless reception station.

In FIG. 2, a processing procedure performed in the multicast transmission rate control unit 105 for determining the optimum value of the multicast transmission rate according to the communication quality of each wireless reception station is shown in a flowchart format.

First, the multicast transmission rate control unit 105 sets the initial value of the multicast transmission rate to be used when performing multicast transmission (step S201).

Each client station configuring the multicast group returns feedback information relating to the communication quality of the multi cast data respectively received at a predetermined cycle. Then, the multicast transmission rate control unit 105 determines whether feedback information is received from all the client stations configuring the multicast group, that is, whether or not the communication quality information of all the client stations is acquired (step S202). Here, as feedback information, the packet arrival rate (=1-PLR) is used (see above).

In addition, the multicast transmission rate control unit 105 provides a time-out in step S202. When a response may not be received from all the client stations configuring the multicast group until a certain time passes from the start of the process of step S202, it is determined that the predetermined communication quality (Q1) is not satisfied in at least one of the client stations.

When feedback information from at least one client station was not received and it was difficult to acquire communication quality information of all the client stations configuring the multicast group (No in step S202), it is estimated that this is caused by the presence of client stations in which the communication quality is poor due to a high transmission rate in the multicast group. In such a case, the multicast transmission control unit 105 sets the multicast transmission rate only one stage lower (step S205) upon determining that the currently set multicast transmission rate is not the lowest rate (No in step S204). In addition, when the currently set multicast transmission rate is the lowest rate (Yes in step S204), the multicast transmission rate control unit 105 returns to step S202.

On the other hand, when it was possible to acquire communication quality information of all the client stations configuring the multicast group (Yes in step S202), the multicast transmission rate control unit 105 proceeds to the next step S203.

In step S203, the multicast transmission rate control unit 105 determines whether or not the packet arrival rate as communication quality information is less than a predetermined value Q1 in at least one of the client stations configuring the multicast group.

When the communication quality information of at least one of the client stations is less than the predetermined value Q1 (Yes in step S203), it is estimated that this is caused by the presence of client stations in which the communication quality is poor due to the present transmission rate in the multicast group being too high. In such a case, the multicast transmission control unit 105 sets the multicast transmission rate only one stage lower (step S205) upon determining that the currently set multicast transmission rate is not the lowest rate (No in step S204). In addition, when the currently set multicast transmission rate is the lowest rate (Yes in step S204), the multicast transmission rate control unit 105 returns to step S202.

In this manner, by repeating a process in which the multicast transmission rate is deteriorated when the communication quality of the multicast transmission is less than a predetermined value Q1 in at least a part of the plurality of reception terminals configuring the multicast group, it is possible to set a multicast transmission rate in which the communication quality of the multicast transmission satisfies the predetermined value Q1 in all the plurality of reception terminals configuring the multicast group.

Meanwhile, when the communication quality information of all the client stations configuring the multicast group is equal to or more than the predetermined value Q1 (No is step S203), the multicast transmission rate control unit 105 proceeds to the next step S206.

In step S206, the multicast transmission rate control unit 105 determines whether or not the packet arrival rate as communication quality information in all the client stations configuring the multicast group is equal to or more than a predetermined value Q2 (here, Q2>Q1).

When communication quality information of at least one client station is less than a predetermined value Q2 (No in step S206), if considered together with the determination result in step S203, the currently set multicast transmission rate may be considered as appropriate with respect to the communication quality in the client stations configuring the multicast group. Therefore, the multicast transmission rate control unit 105 returns to step S202 without change.

Meanwhile, when the communication quality information in all of the client stations configuring the multicast group is equal to or more than the predetermined value Q2 (step S206), it is estimated that the reception level is sufficiently high even at the end portion of the service area of the access point AP. In such a case, by raising the multicast transmission rate one stage only (step S208) upon determining that the currently set multicast transmission rate is not the highest rate (No in step S207), the multicast transmission rate control unit 105 shortens the time for which the wireless bandwidth is occupied by the multicast transmission and promotes improvement in the transmission efficiency of the whole system. Further, when the currently set multicast transmission rate is the highest rate (Yes in step S207), the multicast transmission rate control unit 105 returns to step S202.

In addition, the multicast transmission rate control section 105 periodically performs the process of step S202 at a predetermined cycle.

As described above, the access point AP performs control of the multicast transmission rate using the communication quality of all of the client stations configuring the multicast group.

In the wireless LAN system according to the present embodiment, it has already been described that it is possible to use the packet arrival rate (=1-PLR) as an index of communication quality. In addition to the packet arrival rate, the received signal strength of the multicast data received in the client stations (Received Signal Strength Indication: RSSI) [dBm] or the like may also be used. In addition, two or more indexes such as the packet arrival rate and the received signal strength may be combined so as to create a communication quality index. Furthermore, it may be set so that feedback is given to the access point AP using different types of communication quality index for each client station.

Figure 3:
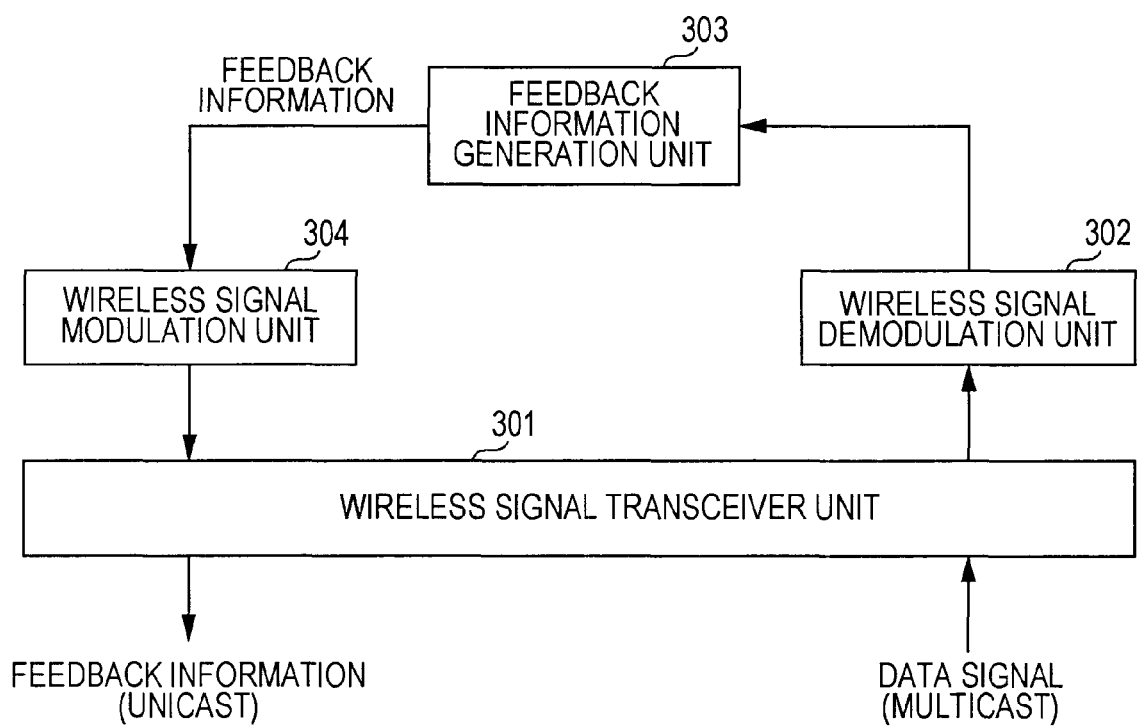
FIG. 3 is a diagram schematically showing a functional configuration for a client station configuring a multicast group in a wireless LAN system to return feedback information.
Figure 6:
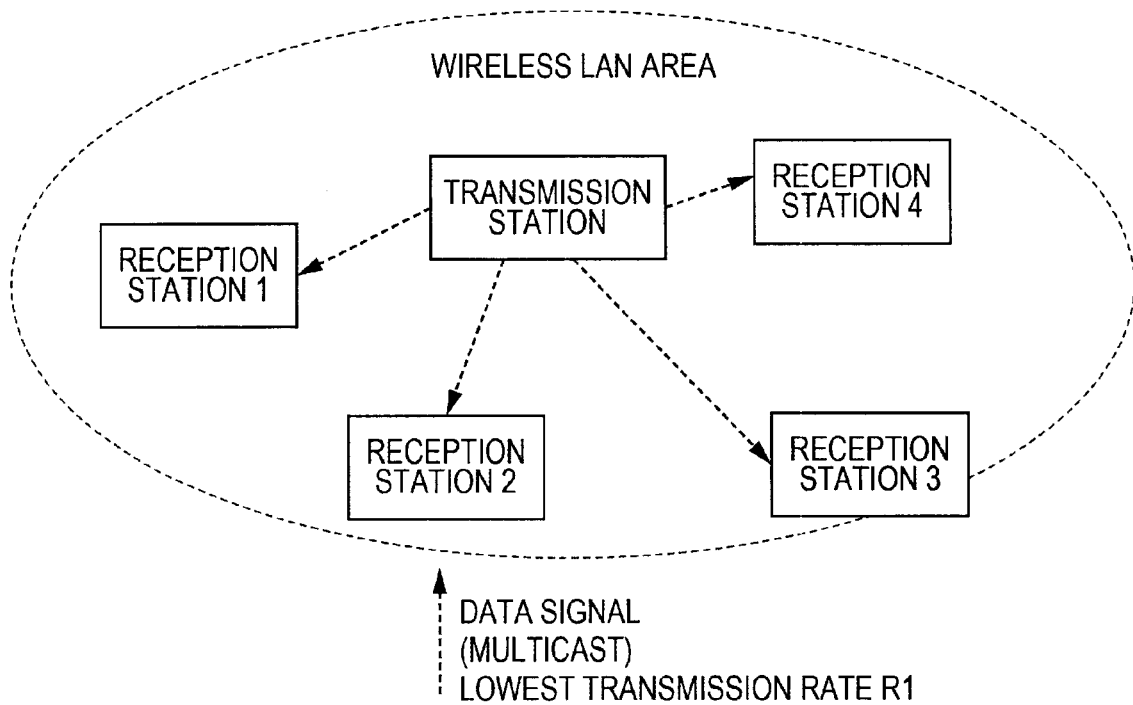
FIG. 6 is a view showing a situation of performing multicast transmission from one multicast transmission station to a plurality of multicast reception stations.
Figure 7:
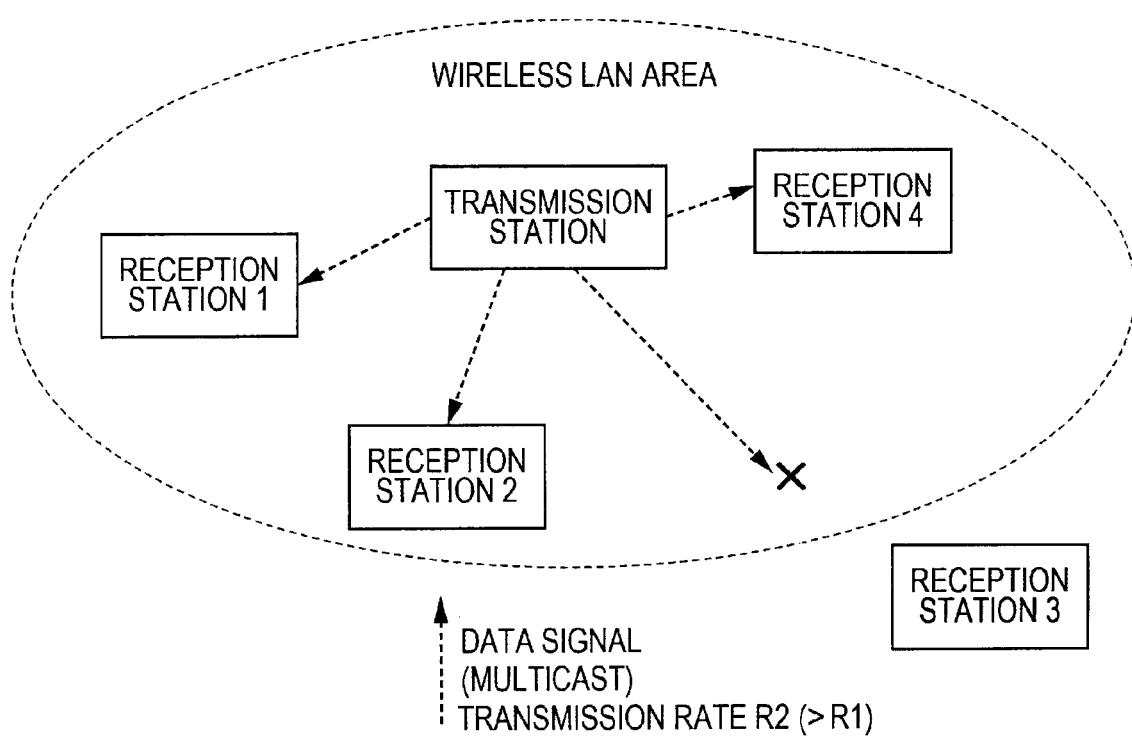
FIG. 7 is a view showing a situation of performing multicast transmission from one transmission station to a plurality of reception stations at a transmission rate R2 (R2>R1) higher than a lowest transmission rate R1.

FIG. 3 schematically shows a functional configuration for a client station configuring a multicast group in a wireless LAN system to return feedback information. The shown client station is provided with a wireless signal transceiver unit 301, a wireless signal demodulation unit 302, a feedback information generation unit 303, and a wireless signal modulation unit 304. Typically, the client station does not send an ACK response with respect to multicast signals.

The wireless signal transceiver unit 301 receives the multicast signal from the access point AP and sends the signal to the wireless signal demodulation unit 302. Then, the wireless signal demodulation unit 302 demodulates the data from the multicast signal.

In addition, the wireless signal transceiver unit 301 or the wireless signal demodulation unit 302 measures the communication quality with respect to the multicast transmission and provides notification thereof to the feedback information generation unit 303. In this embodiment, the wireless signal demodulation unit 302 measures the total number of packets sent from the wireless signal transceiver unit 301 and the number of packets which were not demodulated as information relating to communication quality with respect to the multicast transmission, and provides notification thereof to the feedback information generation unit 303.

The feedback information generation unit 303 calculates the packet loss rate PLR per unit of time based on the data reported by the wireless signal demodulation unit 302, generates feedback information such as the packet arrival rate (1-PLR), and periodically sends the feedback information to the wireless signal modulation unit 303.

The wireless signal modulation unit 304 modulates the feedback information. Then, the wireless signal transceiver unit 301 periodically returns the feedback information to the access point AP by unicast transmission.

Here, it has already been described that each client station configuring the multicast group returns feedback relating to the communication quality of the respective multicast transmissions at a predetermined cycle. By performing carrier sensing and back off control, each client station respectively returns feedback information to the access point AP at timings that do not conflict with each other. Since carrier sensing and backoff control are well-known techniques in the field, detailed description thereof is omitted in this specification.

In addition, in addition to the arrival rate of packets transmitted by multicast, each client station may measure the received signal strength (RSSI) of received multicast data in the client stations and transmit the result as feedback information relating to the communication quality of the multicast transmission. In addition, two or more indexes such as the packet arrival rate and the received signal strength may be combined so as to create feedback information. Furthermore, it may be set so that feedback is given to the access point AP using different types of communication quality index for each client station.

FIG. 4 shows a situation where a client station STA3 moves to an end portion of the service area of the access point AP and packet loss is greatly generated when data is transmitted by multicast from the access point AP to each client station STA1, STA2, STA3, and STA4 in the multicast group.

In the processing procedure shown in FIG. 2, in at least one client station configuring the multicast group, if the packet arrival rate as communication quality information becomes less than a predetermined value Q1, it is estimated that this is caused by the present transmission rate being too high and, upon determining that the multicast transmission rate is not the lowest rate, the multicast transmission rate is set only one stage lower.

If the predetermined value Q1 of the packet arrival rate is set as 99% (at a packet loss rate of 1%), the packet arrival rate in the client station STA3 is 97% (at a packet loss rate of 3%) which is less than Q1. The client station STA3 returns feedback information showing the fact that the communication quality is deteriorated; however, when the communication quality is further deteriorated, it may no longer be possible to return feedback information. In addition, the multicast transmission rate currently set by the access point AP is set to R2 which is one or more stages higher than the lowest rate. When the access point AP receives feedback information returned from the client station STA3, the multicast transmission rate is set to be only one stage lower.

FIG. 5 shows a situation in which the communication quality of the client station STA3 is improved by the access point AP setting the multicast transmission rate to R1 which is one stage lower than R2 in the situation shown in FIG. 4. The packet arrival rate fed back from any of the client stations STA1 to STA4 is also greater than the predetermined value Q1.

In this manner, control, in which the access point AP transmits data by multicast and the multicast transmission rate is determined according to feedback information, is periodically performed at a predetermined cycle. Thus, even in a case where the client stations in the multicast group move and vary in communication quality, the access point AP may select an optimal multicast transmission rate according to the situation at that moment and perform multicast transmission with respect to all the client stations in the multicast group.

In addition, the technology of the present disclosure may adopt the following configuration.

(1) A communication apparatus comprising: an interface that receives, from a plurality of other communication apparatuses, information indicating communication quality of a multicast transmission transmitted from the communication apparatus to each of the plurality of other communication apparatuses; and a processor that controls a multicast transmission rate based on the information received from the plurality of other communication apparatuses.

(2) The communication apparatus of (1), wherein the information indicating communication quality corresponds to a packet loss rate (PLR).

(3) The communication apparatus of any one of (1) or (2), wherein the information indicating communication quality corresponds to a received signal strength indication (RSSI).

(4) The communication apparatus of any one of (1) to (3), wherein the information indicating communication quality corresponds to a communication quality index that represents a plurality of communication quality parameters.

(5) The communication apparatus of any one of (1) to (4), wherein the processor controls the interface to transmit a pseudo-training signal to each of the plurality of other communication apparatuses.

(6) The communication apparatus of (5), wherein the processor controls the interface to transmit the pseudo-random training signal to each of the plurality of other communication apparatuses at predetermined intervals.

(7) The communication apparatus of any one of (5) and (6), wherein the information indicating communication quality received from the plurality of other communication apparatuses is based on the pseudo-random training signal.

(8) The communication apparatus of any one of (1) to (7), further comprising: a memory that stores information indicating that the plurality of other communication apparatuses are part of a same multicast group.

(9) The communication apparatus of any one of (1) to (8), wherein the processor compares the information indicating communication quality received from each of the plurality of other communication apparatuses to a predetermined threshold.

(10) The communication apparatus of (9), wherein the processor controls the multicast transmission rate based on a result of the comparing.

(11) The communication apparatus of any one of (9) and (10), wherein, when a result of the comparing indicates that the information indicating communication quality received from at least one of the plurality of other communication apparatuses is less than the predetermined threshold, the processor controls the multicast transmission rate to be lowered.

(12) The communication apparatus of any one of (9) to (11), wherein, when a result of the comparing indicates that the information indicating communication quality received from each of the plurality of other communication apparatuses is greater than or equal to the predetermined threshold, the processor compares the information indicating communication quality received from each of the plurality of other communication apparatuses to a second predetermined threshold.

(13) The communication apparatus of (12), wherein, when a result of the comparing indicates that the information indicating communication quality received from each of the plurality of other communication apparatuses is greater than or equal to the second predetermined threshold, the processor controls the multicast transmission rate to be increased.

(14) The communication apparatus of (12) or (13), wherein, when a result of the comparing indicates that the information indicating communication quality received from each of the plurality of other communication apparatuses is less than the second predetermined threshold, the processor controls the multicast transmission rate to be unchanged.

(15) The communication apparatus of any one of (1) to (14), wherein the processor determines whether the information indicating communication quality has been received from each of the plurality of other communication apparatuses.

(16) The communication apparatus of (17), wherein, when the processor determines that the information indicating communication quality has not been received from one of the plurality of other communication apparatuses, the processor determines that a communication quality corresponding to the one of the plurality of other communication apparatuses does not satisfy a predetermined threshold and controls the transmission rate to be lowered.

(17) A method performed by a communication apparatus, the method comprising: receiving, from a plurality of other communication apparatuses, information indicating communication quality of a multicast transmission transmitted from the communication apparatus to each of the plurality of other communication apparatuses; and controlling a multicast transmission rate based on the information received from the plurality of other communication apparatuses.

(18) A non-transitory computer-readable medium including computer program instructions, which when executed by a communication apparatus, cause the communication apparatus to perform a method comprising: receiving, from a plurality of other communication apparatuses, information indicating communication quality of a multicast transmission transmitted from the communication apparatus to each of the plurality of other communication apparatuses; and controlling a multicast transmission rate based on the information received from the plurality of other communication apparatuses.

(19) A communication apparatus comprising: an interface that receives a multicast transmission from another communication apparatus; and a processor that determines information indicating communication quality of the multicast transmission received from the another communication apparatus, wherein the processor controls the interface to transmit the information to the another communication apparatus that controls a multicast transmission rate based on the information.

(20) A method performed by a communication apparatus, the method comprising: receiving a multicast transmission from another communication apparatus; determining information indicating communication quality of the multicast transmission received from the another communication apparatus; and transmitting the information to the another communication apparatus that controls a multicast transmission rate based on the information.

(21) A non-transitory computer-readable medium including computer program instructions, which when executed by a communication apparatus, cause the communication apparatus to perform a method comprising: receiving a multicast transmission from another communication apparatus; determining information indicating communication quality of the multicast transmission received from the another communication apparatus; and transmitting the information to the another communication apparatus that controls a multicast transmission rate based on the information.

(22) A communication system comprising: a plurality of first communication apparatuses that each: receive a multicast transmission from a second communication apparatus; determine information indicating communication quality of the multicast transmission received from the another communication apparatus; and transmit the information to the second communication apparatus; and the second communication apparatus that: receives the information from the plurality of first communication apparatuses; and controls a multicast transmission rate based on the information received from the plurality of first communication apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. A communication apparatus comprising:
an interface that receives, from a plurality of other communication apparatuses, information indicating communication quality of a multicast transmission transmitted from the communication apparatus to each of the plurality of other communication apparatuses; and
a processor that
controls a multicast transmission rate based on the information received from the plurality of other communication apparatuses;
determines whether the information indicating communication quality has been received from each of the plurality of other communication apparatuses; and
determines, when the information indicating communication quality has not been received from one of the plurality of other communication apparatuses, that a communication quality corresponding to the one of the plurality of other communication apparatuses does not satisfy a predetermined threshold and controls the transmission rate to be lowered.

2. The communication apparatus of claim 1, wherein the information indicating communication quality corresponds to a packet loss rate (PLR).

3. The communication apparatus of claim 1, wherein the information indicating communication quality corresponds to a received signal strength indication (RSSI).

4. The communication apparatus of claim 1, wherein the information indicating communication quality corresponds to a communication quality index that represents a plurality of communication quality parameters.

5. The communication apparatus of claim 1, wherein the processor controls the interface to transmit a pseudo-training signal to each of the plurality of other communication apparatuses.

6. The communication apparatus of claim 5, wherein the processor controls the interface to transmit the pseudo-random training signal to each of the plurality of other communication apparatuses at predetermined intervals.

7. The communication apparatus of claim 5, wherein the information indicating communication quality received from the plurality of other communication apparatuses is based on the pseudo-random training signal.

8. The communication apparatus of claim 1, further comprising:
a memory that stores information indicating that the plurality of other communication apparatuses are part of a same multicast group.

9. The communication apparatus of claim 1, wherein the processor compares the information indicating communication quality received from each of the plurality of other communication apparatuses to a predetermined threshold.

10. The communication apparatus of claim 9, wherein the processor controls the multicast transmission rate based on a result of the comparing.

11. The communication apparatus of claim 9, wherein, when a result of the comparing indicates that the information indicating communication quality received from at least one of the plurality of other communication apparatuses is less than the predetermined threshold, the processor controls the multicast transmission rate to be lowered.

12. The communication apparatus of claim 9, wherein, when a result of the comparing indicates that the information indicating communication quality received from each of the plurality of other communication apparatuses is greater than or equal to the predetermined threshold, the processor compares the information indicating communication quality received from each of the plurality of other communication apparatuses to a second predetermined threshold.

13. The communication apparatus of claim 12, wherein, when a result of the comparing indicates that the information indicating communication quality received from each of the plurality of other communication apparatuses is greater than or equal to the second predetermined threshold, the processor controls the multicast transmission rate to be increased.

14. The communication apparatus of claim 12, wherein, when a result of the comparing indicates that the information indicating communication quality received from each of the plurality of other communication apparatuses is less than the second predetermined threshold, the processor controls the multicast transmission rate to be unchanged.

15. A method performed by a communication apparatus, the method comprising:
receiving, from a plurality of other communication apparatuses, information indicating communication quality of a multicast transmission transmitted from the communication apparatus to each of the plurality of other communication apparatuses;

controlling a multicast transmission rate based on the information received from the plurality of other communication apparatuses;

determining whether the information indicating communication quality has been received from each of the plurality of other communication apparatuses; and determining, when the information indicating communication quality has not been received from one of the plurality of other communication apparatuses, that a communication quality corresponding to the one of the plurality of other communication apparatuses does not satisfy a predetermined threshold and controlling the transmission rate to be lowered.

16. A non-transitory computer-readable medium including computer program instructions, which when executed by a communication apparatus, cause the communication apparatus to perform a method comprising:

receiving, from a plurality of other communication apparatuses, information indicating communication quality of a multicast transmission transmitted from the communication apparatus to each of the plurality of other communication apparatuses;

controlling a multicast transmission rate based on the information received from the plurality of other communication apparatuses;

determining whether the information indicating communication quality has been received from each of the plurality of other communication apparatuses; and determining, when the information indicating communication quality has not been received from one of the plurality of other communication apparatuses, that a communication quality corresponding to the one of the plurality of other communication apparatuses does not satisfy a predetermined threshold and controllin the transmission rate to be lowered.

17. An communication apparatus comprising:
circuitry configured to
determine whether information indicating communication quality of a multicast transmission transmitted from the communication apparatus to each of a plurality of other communication apparatuses has been received from each of the plurality of other communication apparatuses; and control a multicast transmission rate to be lowered when the information indicating communication quality has not been received from one of the plurality of other communication apparatuses.

18. An communication apparatus comprising:
circuitry configured to
determine whether information indicating communication quality of a multicast transmission transmitted from the communication apparatus to each of a plurality of other communication apparatuses has been received from each of the plurality of other communication apparatuses;

determine that a communication quality corresponding to one of the plurality of other communication apparatuses does not satisfy a predetermined threshold when the information indicating communication quality has not been received from the one of the plurality of other communication apparatuses; and control a multicast transmission rate to be lowered when it is determined that the communication quality corresponding to one of the plurality of other communication apparatuses does not satisfy the predetermined threshold.

* * * * *